Jan. 7, 1958 L. J. BOYLE 2,818,940
CHOCK
Filed Aug. 30, 1954 2 Sheets-Sheet 1
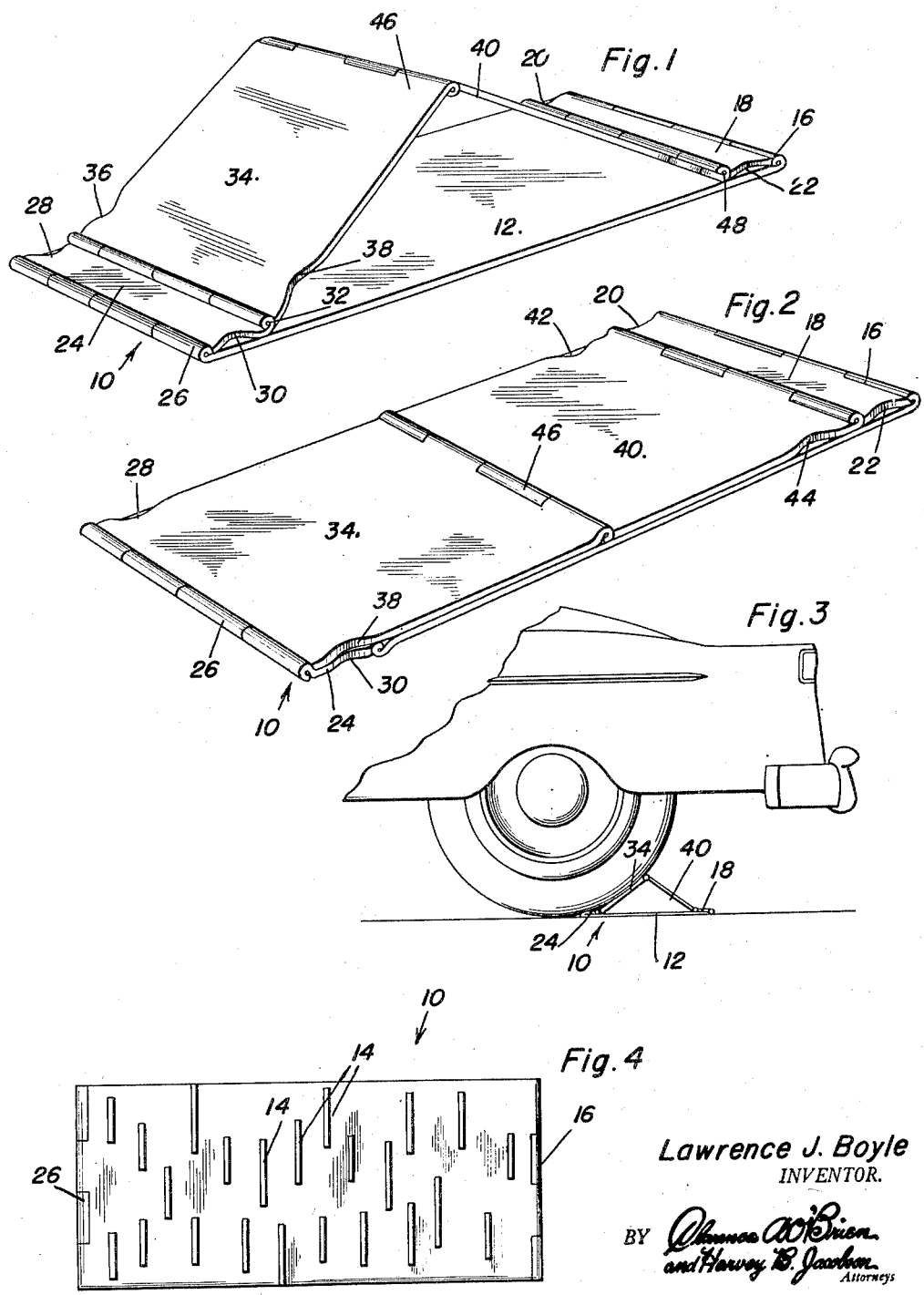
Lawrence J. Boyle
INVENTOR.

Jan. 7, 1958  L. J. BOYLE  2,818,940
CHOCK
Filed Aug. 30, 1954  2 Sheets-Sheet 2
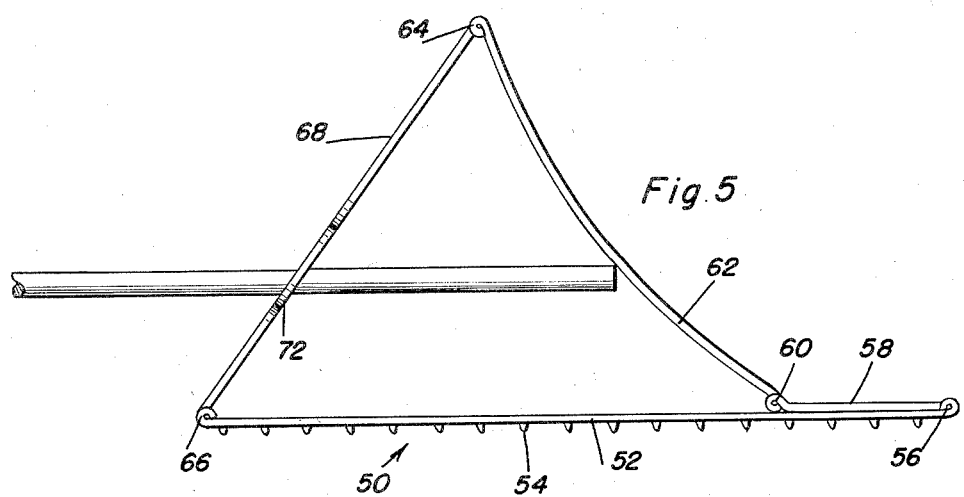
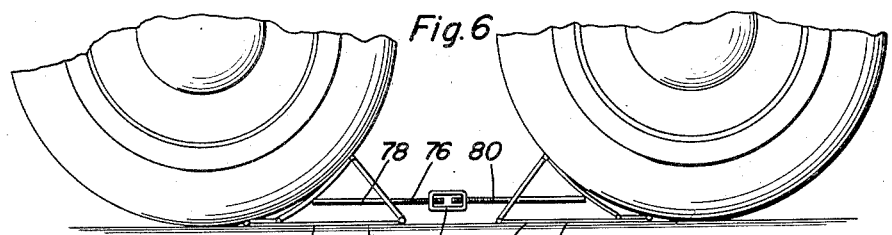
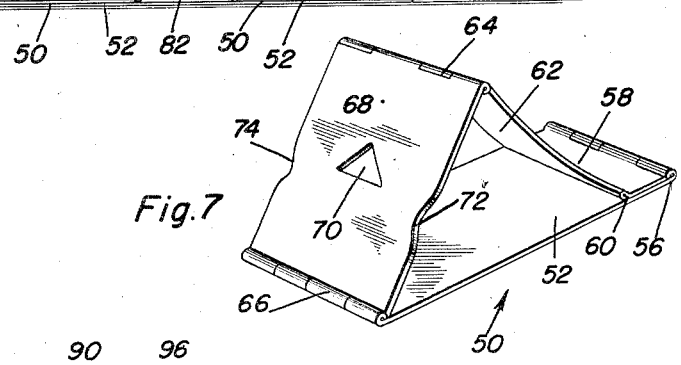
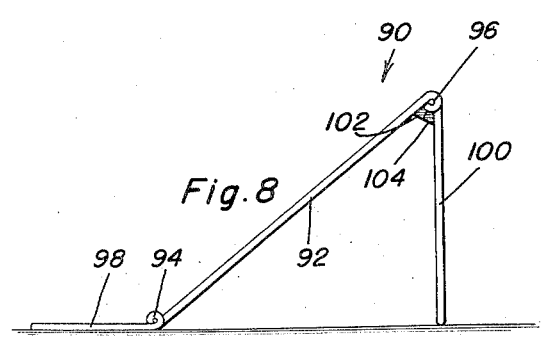
Lawrence J. Boyle
INVENTOR.
BY United States Patent Office 2,818,940
Patented Jan. 7, 1958

2,818,940
CHOCK
Lawrence J. Boyle, Myrtle Creek, Oreg.
Application August 30, 1954, Serial No. 452,938
1 Claim. (Cl. 188—32)

This invention relates to a chock for use in connection with vehicles, and more particularly to a collapsible device adapted for engagement with the wheels of a vehicle so as to maintain the vehicle against accidental movement.

A further object of the invention resides in the provision of a chock which is adapted to be utilized with various types of vehicles and which may be collapsed to a very small compass when not in use.

Yet another object of the invention resides in the provision of a vehicle wheel chock arrangement which is adapted to be utilized in conjunction with trucks and the like vehicles so as to maintain the pairs of wheels thereof against movement.

Still further objects and features of this invention reside in the provision of vehicle wheel chocks that are strong and durable, simple in construction and manufacture, which have means incorporated therein for securely gripping the ground or other surface on which the vehicle is standing, and which are inexpensive to manufacture, thereby permitting wide distribution and utilization.

These, together with the various ancillary objects and features of the invention which will become apparent as the following description proceeds, are attained by these vehicle wheel chocks, preferred embodiments of which have been illustrated in the accompanying drawings, by way of example only, wherein:

Figure 1 is a perspective view of a vehicle wheel chock constructed in accordance with the concepts of the present invention;

Figure 2 is another perspective view of the vehicle wheel chock shown in collapsed position for storing;

Figure 3 is a side elevational view illustrating the manner in which the vehicle wheel chock is utilized;

Figure 4 is a bottom plan view of the vehicle wheel chock;

Figure 5 is a side elevational view of a modified form of a vehicle wheel chock;

Figure 6 is another side elevational view in a reduced scale illustrating the vehicle wheel chock of Figure 5 as used in pairs in a novel wheel chock arrangement;

Figure 7 is a perspective view of one of the vehicle wheel chocks which are adapted to be used in pairs; and Figure 8 is an elevational view of a further modified form of vehicle wheel chock.

With continuing reference to the accompanying drawings wherein like reference numerals designate similar parts throughout the various views, and with initial attention to the form of the invention as shown in Figures 1 through 4, it will be seen that herein there is disclosed a vehicle wheel chock 10 including a base plate 12 formed of any suitable material such as metal, plastics, or the like, of any suitable material. The base plate 12 is provided with a plurality of downwardly projecting and staggered gripping teeth 14 which are adapted to bite into the surface on which the vehicle is positioned and to increase the frictional interengagement between the chock and the surface on which the vehicle is supported.

Hingedly attached to the base plate 12 by means of a hinge 16 is a link plate 18 which has arcuate recess portions 20 and 22 formed in the edges thereof so that the plate 18 may be readily engaged and separated from the base plate 12 when desired. Another link plate 24 similar to link plate 18 is hingedly secured as at 26 to the base plate 12 at the opposite end thereof and has recesses as at 28 and 30 similar to 20 and 22. Hingedly secured, as at 32, is a wheel engaging plate 34 which extends angularly upwardly and which has recesses, as at 36 and 38, in the periphery thereof so that the plate 34 may be readily engaged by the fingers of a person utilizing the chock 10. A support plate 40 of similar construction to the wheel engaging plate 34 and provided with arcuate recesses 42 and 44 is hingedly secured to the wheel engaging plate 34, as at 46, and to the link plate 18, as at 48. The support plate 40 can readily be utilized as a wheel engaging plate with the other plate 34 then acting as a support plate.

In use, the wheel chock 10 may be erected from the collapsed position as is shown in Figure 2 to the position as is shown in Figure 1 by the rotation of one of the link plates 18 or 24 so that both plates will overlie the base plate 12 holding the wheel engaging plate 34 and the support plate 40 angularly with respect to the base plate 12. Then, positioning the chock 10 adjacent the wheel of a vehicle, the wheel engaging plate 34 will, because of its upwardly extending direction, prevent the rolling backward or forward, dependent upon the position of the chock of the vehicle.

Referring now to the embodiment of the invention as is shown in Figures 5 through 7, it will be noted that herein there is disclosed a chock 50 having a base plate 52 provided with downwardly projecting teeth 54. Hingedly secured to the base plate 52 as at 56 is a link plate 58 which has hingedly connected thereto, as at 60, a preferably arcuate wheel engaging plate 62. Hingedly connected to the wheel engaging plate, as at 64, and to the base plate, as at 66, is a support plate 68. The support plate may be provided with an aperture 70 extending therethrough, and preferably of triangular configuration, but of course other shapes of apertures 70 may be utilized. Arcuate recesses, as at 72 and 74, may be provided for the support plate 68 so that the support plate 68 may be readily raised out of engagement with the base plate 52 if so folded thereon.

The chock 50 may be collapsed by rotating the link plate 58 outwardly so as to be extended with respect to the base plate 52. This will form a substantially collapsed structure. By folding the link plate 58 to the position as shown in Figure 5, the wheel engaging plate 62 is adapted to be placed so that it will prevent wheels from rolling. The wheel chocks 50 may be utilized in pairs, as can be seen in Figure 6. An adjustable rod 76 is provided and comprises a pair of threaded rod sections 78 and 80 which are interconnected by a turnbuckle like element 82. The rod 76 is so arranged as to extend through the apertures 70 in the support plates 68 of the chocks 50 and to engage the wheel engaging plates 62 to prevent shifting of these chocks. It is noted that the edges of the wheels are adapted to engage the wheel chocks 10 or 50 so as to depress the base plates 52 inwardly toward the ground and thus lock them in position by increasing the frictional resistance against movement of the chocks.

Referring now to Figure 8, it will be seen that herein there is disclosed a modified form of chock as generally designated by reference numeral 90 which includes a wheel engaging plate 92 having hingedly attached, as at 94 and 96, a link plate 98 and a support plate 100. The chock is adapted to be positioned so that the wheel engaging plate 92 is adjacent the wheel of a vehicle and that any pressure on the wheel engaging plate 92 will drive the support plate 100 downwardly. Stop lugs as at 102 and 104 are welded or otherwise attached to the wheel-engaging plate 92 and the support plate 100, respectively, so as to prevent the collapse of the chock 90 by limiting the rotation of the support plate 100 with respect to the wheel-engaging plate 92.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A foldable vehicle wheel chock comprising a rectangular base plate, a comparatively short link plate hingedly secured at a first edge to a first transverse edge of said base plate, said link plate including a surface portion engageable in overlying juxtaposition on an upper surface portion of said base plate, a wheel engaging plate hingedly secured at a first edge to an edge of said link plate opposite said first edge of said link plate extending angularly upwardly therefrom, and a support plate hingedly secured at a first edge to an edge of said wheel engaging plate opposite the first edge of said wheel engaging plate, said support plate being extendable angularly downwardly toward said base plate, said support plate including an edge portion opposite the first edge of said support plate pivotally secured adjacent a transverse edge opposite the first transverse edge of said base plate, said base plate including a plurality of downwardly projecting gripping teeth on a lower surface thereof, said support plate being hingedly secured at the edge opposite the first edge thereof to a first edge of a second link plate, said second link plate being hingedly secured to a transverse edge portion of said base plate opposite the first transverse edge portion thereof, the combined length of said second link plate and said base plate being equal to the combined length of said first link plate, said wheel engaging plate and said support plate, said second link plate resting on said base plate forming a stop for said support plate.

References Cited in the file of this patent
UNITED STATES PATENTS

| | | |
|---|---|---|
| 1,149,006 | Weaver | Aug. 3, 1915 |
| 1,223,247 | Bolopue | Apr. 17, 1917 |
| 1,480,725 | Israel | Jan. 15, 1924 |
| 1,617,369 | Blakely | Feb. 15, 1927 |
| 1,768,265 | Nicholls | June 24, 1930 |
| 2,011,469 | Bruggemann | Aug. 13, 1935 |
| 2,240,512 | Morgensen | May 6, 1941 |
| 2,671,533 | Taylor | Mar. 9, 1954 |

FOREIGN PATENTS

| | | |
|---|---|---|
| 264,728 | Italy | May 8, 1929 |